United States Patent [19]

Hase et al.

[11] 3,881,685

[45] May 6, 1975

[54] DEVICE FOR CONTROLLING THE CLOSURE OF CARBURETOR BUTTERFLY VALVE

[75] Inventors: Masaru Hase, Toyota; Shinya Ishihara; Mikio Maki, both of Anjo; Kiyohiko Mizuno, Nagoya, all of Japan

[73] Assignees: Nippondenso Co., Ltd.; Toyota Jidosha Kogyo Kabushiki Kaisha, Kariya-shi, Japan

[22] Filed: July 27, 1973

[21] Appl. No.: 383,054

[30] Foreign Application Priority Data

July 31, 1972 Japan.................................. 47-77161

[52] U.S. Cl.............. 251/48; 123/97 B; 123/103 E; 261/DIG. 18
[51] Int. Cl............................................. F02d 11/08
[58] Field of Search........... 123/103 C, 103 E, 97 B; 251/47, 48; 261/DIG. 18

[56] References Cited
UNITED STATES PATENTS

| | | | |
|---|---|---|---|
| 3,081,846 | 3/1963 | Lift..................... | 251/48 X |
| 3,081,847 | 3/1963 | Smitley................ | 251/48 X |
| 3,623,465 | 11/1971 | Wawrziniok............ | 123/103 E X |
| 3,670,708 | 6/1972 | Ojala.................. | 123/103 E |
| 3,721,222 | 3/1973 | Shioya et al........... | 123/103 E X |

*Primary Examiner*—Alan Cohan
*Assistant Examiner*—Gerald A. Michalsky
*Attorney, Agent, or Firm*—Cushman, Darby & Cushman

[57] ABSTRACT

A device for controlling the closure of a carburetor butterfly valve, comprising a lever pivotally movable integrally with the carburetor butterfly valve of an engine, a dash pot having a main shaft caused to make a reciprocal movement by said lever incident to the opening and closing operation of said butterfly valve and a sub-shaft operatively associated with said main shaft to make a reciprocal movement and having at one end a change-over valve for changing over the passages of fluid, said dash pot being provided with means for mechanically retarding the movement of said main shaft when said butterfly valve is closed, and a positioner which, when said butterfly valve is opened, is shaifted to a position to limit the closure of said butterfly valve under the fluid pressure supplied to said positioner through the operation of said changeover valve, whereby at the time of deceleration of the engine the opening of the said butterfly valve is maintained larger than that at no-load operation of the engine for a predetermined period of time.

3 Claims, 3 Drawing Figures

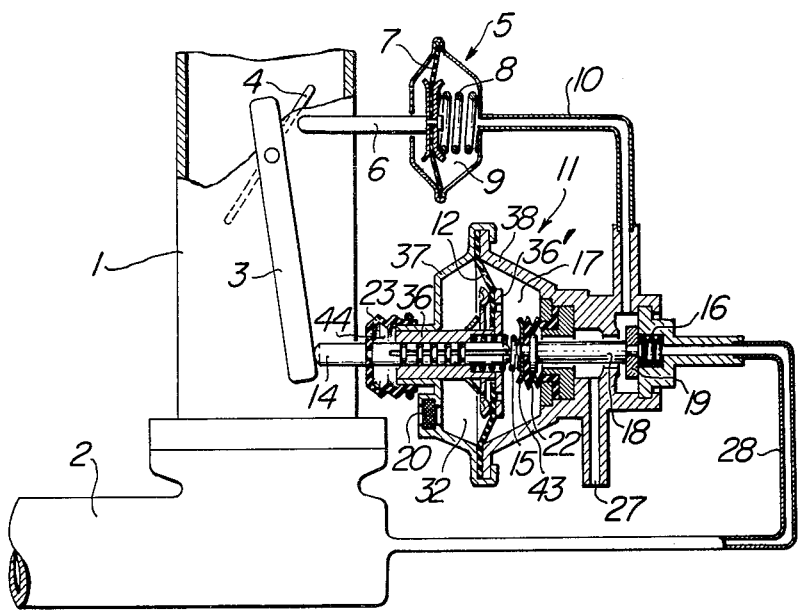
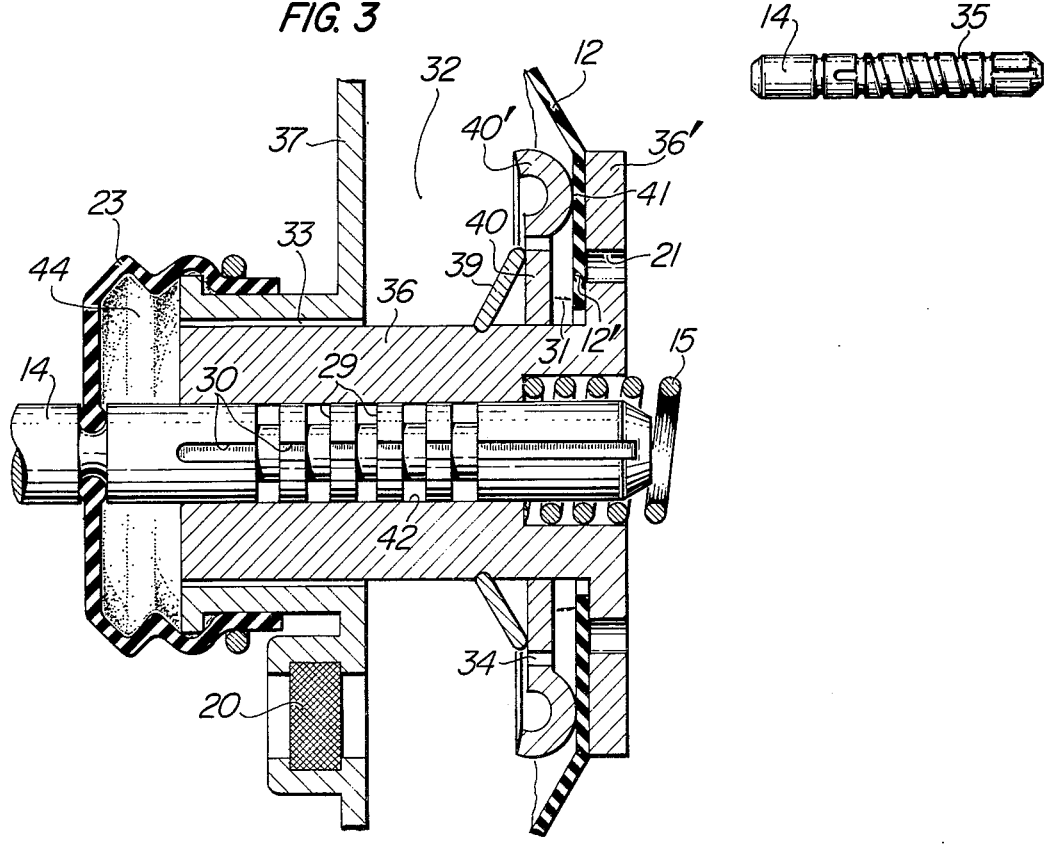

DEVICE FOR CONTROLLING THE CLOSURE OF CARBURETOR BUTTERFLY VALVE

BACKGROUND OF THE INVENTION

1. Field of the Invention

This invention relates to a device for controlling the closure of a carburetor butterfly valve and more particularly to improvements in the throttle positioner which keeps the carburetor butterfly valve slightly opened for a predetermined period of time at the end of deceleration for supplying a suitable quantity of air to the engine to facilitate the combustion of the fuel to avoid the occurrence of such phenomenon in which the engine operates at a relatively high speed at the time of deceleration, with the carburetor butterfly valve fully closed, with the result that incomplete combustion occurs in the combustion chambers with an increasing amount of unburned gas remaining in said combustion chambers and large amounts of toxic components, such as hydrocarbons (HC) or carbon monoxide (CO) are discharged into the atmosphere along with the exhaust gas.

2. Description of the Prior Art

In order to avoid the phenomenon described above, there has been proposed a method in which the closing time of the butterfly valve is retarded by using a dash pot, or a method in which the butterfly valve is kept slightly opened by the action of a diaphragm of a positioner operated by the engine manifold vacuum pressure supplied thereto through an electromagnetic changeover valve which is actuated by a signal from a discriminator for discriminating the vehicle speed detected by a detector, such as a speedometer, when the vehicle speed is decelerated from a speed of the vehicle over a predetermined speed, and then is closed fully under the effect of the atmospheric pressure which is supplied by the operation of said electromagnetic change-over valve which is then changed in position, when the vehicle speed has dropped below a predetermined value. However, such prior art methods have been unsatisfactory. Namely, the former method has had the disadvantages that, since the closing time of the butterfly valve is retarded at deceleration of the engine from any speed, e.g. the speed at the no-load operation of the engine or an extremely low speed of the engine when the butterfly valve is open at an angle, for example, of about 3°, the engine brake becomes ineffective or the engine speed becomes extremely high at no load, and that an extremely small hole used as retarding means tends to be clogged by dusts. The latter method which has been proposed as a solution to the defects of the former method, has had the disadvantages that the method calls for a detector for detecting the vehicle speed and a discriminator for discriminating the detected vehicle speed, which render the mechanism complicated and add to the cost of the mechanism.

SUMMARY OF THE INVENTION

The present invention contemplates the elimination of the above-described disadvantages of the conventional methods and has for its object the provision of a device which comprises a dash pot operating with a time lag when the vehicle is decelerated from a predetermined speed or higher or the carburetor butterfly valve is closed from a predetermined angle or larger, and a positioner adapted to keep the butterfly valve in a slightly open position by the action of a diaphragm, operating incident to the operation of said dash pot, for a predetermined period of time at the end of deceleration; and which achieves a remarkable effect in preventing the generation of unburned toxic components at the time of deceleration of the vehicle, without being accompanied by the disadvantages of the conventional methods that the mechanism used operates undesirably at the deceleration of the vehicle from a low speed or no-load operation and that the mechanism becomes complicated in construction, is liable to troubles and is expensive.

According to the present invention, there is provided a device for controlling the closure of a carburetor butterfly valve of an engine, comprising a lever pivotally movable integrally with the carburetor butterfly valve; a dash pot having a main shaft operatively associated with said lever and making a reciprocal movement incident to the opening and closing operation of said butterfly valve while said lever is in a predetermined range of angular position, means for mechanically retarding the movement of said main shaft when said butterfly valve is closed, and a sub-shaft operatively connected at one end to said main shaft through a spring so as to make a reciprocal movement incident to the movement of said main shaft and having a changeover valve for changing over the passages of fluid at the other end thereof; and a positioner having a stopper; said stopper being shifted to a position to limit the closure of said butterfly valve under the fluid pressure supplied to said positioner through the operation of said change-over valve when said butterfly valve is opened, whereby at the time of deceleration said butterfly valve is maintained open for a predetermined period of time at an angle larger than the angle at the no-load operation of the engine.

The invention will now be described further, with reference to the various figures of the accompanying drawings.

BRIEF DESCRIPTION OF THE DRAWINGS

FIG. 1 is a vertical sectional view, partially cut away, of an embodiment of the device for controlling the closure of a carburetor butterfly valve according to the present invention;

FIG. 2 is a front elevational view of another type of the main shaft of the dash pot; and FIG. 3 is a vertical sectional view showing in an enlarged scale the essential portion of the dash pot shown in FIG. 1.

In the drawings, same reference numerals indicate same or corresponding parts.

DESCRIPTION OF THE PREFERRED EMBODIMENT

In FIGS. 1 and 3, reference numeral 1 designates a carburetor, 2 an intake manifold, 3 a lever operating integrally with a carburetor butterfly valve 4 and 5 a positioner for regulating the angular position of said lever 3. The positioner 5 comprises a pressure chamber 9, a diaphragm 7 operated by fluid pressure, a stopper 6 operating integrally with said diaphragm 7 to define the angular position of the lever 3 and a spring 8 for moving the diaphragm. Reference numeral 11 generally designates a dash pot which is set by the lever 3. The dash pot 11 comprises a main body 36 having an axial bore formed therein, and left and right casings 37, 38. A gap 33 is formed between the outer peripheral surface of one end of the main body 36 and the casing 37, and a flange 36' is formed at the other end of the main body 36. A diaphragm 12 has its outer peripheral edge clamped between the casings 37 and 38, and its inner peripheral edge is securely fitted to the flange 36' by a pressing portion 40' formed at the outer periphery of a diaphragm holding plate 40 which is mounted on the main body 36 and held in position by a support member 39. The portion of the diaphragm 12 radially inwardly of the point 41 of contact between the pressing portion 40' and said diaphragm 12 forms a check valve 12' which reciprocates as indicated by the arrows 31 in FIG. 3. A main shaft 14 has a portion of its outer peripheral surface engaged integrally with the inner surface of the axial bore of the main body 36, and reciprocates integrally with said main body. The main shaft 14 had formed in the outer peripheral surface thereof a plurality of spaced circumferential grooves 29 and an axial groove 30 of a small cross-section communicating said circumferential grooves 29 with each other. These grooves 29, 30 constitute a labyrinth groove, and provide a narrow passage for air which serves to restrict the velocity of air passing therein. A bellows 23 is connected to the casing 37 and the main shaft 14 to prevent intrusion of dusts into the dash pot. A sub-shaft 18 has a bellows 22 connected to one end and a valve 19 connected to the other end thereof. The bellows 22 is provided with a spring seat 43 at the top thereof which engages with a spring 15 disposed in the axial bore of the main body 36 so as to surround the main shaft 14. A spring 16 is provided at the other end of the sub-shaft 18 to urge the valve 19 leftwards. The springs 15 and 16 respectively have different spring constants. The space defined by the casings 37, 38 is divided into two chambers 32 and 17 by the diaphragm 12. Reference numeral 20 designates a filter to remove dusts from the atmospheric air, and 21 and 34 designate release holes formed in the flange 36' and the diaphragm holding plate 40 respectively. Reference numeral 27 designates a conduit for communicating the interior of the casing with the atmosphere, 28 a conduit for communicating the interior of the casing with the intake manifold 2, and 10 a conduit for communicating the interior of the casing with the pressure chamber 9 of the positioner 5.

The device of the construction described above operates in the following manner: Initially, the shafts 14, 18 are in their leftward positions shown in the drawings, and the valve 19 is in a position to sever communication between the conduits 10 and 27. When the carburetor butterfly valve 4 is opened at an angle larger than a predetermined angle to accelerate the vehicle, the lever 3 makes a counterclockwise pivotal movement pushing the main shaft 14 rightwards, which in turn causes the diaphragm 12, connected integrally therewith, to move rightwards while compressing the spring 15, through the main body 36. In this case, the fluid in the pressure chamber 17 rapidly moves into the chamber 32 through the release hole 21, the check valve 12' and the release hole 34. When the load exerted on the spring 15 connected to the main body 36 exceeds a predetermined value, the main shaft 14 comes to push one end of the sub-shaft 18 through the spring 15, and the sub-shaft 18 moves rightwards as the load increases, while compressing the spring 16, and finally reaches a position to cause the valve 19, connected to the other end of said sub-shaft, to close the open end of the conduit 28. The dash pot thereafter occupies the position shown in FIG. 1, so that communication is established between the conduits 10 and 27 and the atmospheric pressure appears in the pressure chamber 9 of the positioner 5. The diaphragm 7 is moved leftwards by the spring 8 and, therefore, the stopper 6 is projected leftwards to a position to keep the butterfly valve 4 opened at a predetermined angle through the lever 3 in the event when the vehicle is decelerated. In the deceleration of the vehicle, the lever makes a clockwise pivotal movement relieving the main shaft 14 from restraint. Therefore, the diaphragm 12 and the main body 36 tend to move leftwards under the biasing force of the spring 15 and the main shaft 14 also tends to move leftwards. However, the fluid flows from a chamber 44 on the left side of the main body 36 into the pressure chamber 17 only through the grooves 30, 29 and the flow velocity of the fluid is extremely low for the reason mentioned previously, so that the diaphragm 12 and the main shaft 14 move leftwards only slowly. In this case, the fluid in the chamber 32 flows into the chamber 44 mainly through the gap 33. When the main shaft 14 has reached a certain point in its leftward movement and the force acting on the sub-shaft 18, including the biasing force of the spring 16, has become larger than the sum of the biasing force of the spring 15 acting in the opposite direction and the vacuum pressure acting on the valve 19, the sub-shaft 18 starts moving leftwards, so that the valve 19 connected to said sub-shaft 18 disengages from the valve seat and moves quickly leftwards, severing communication between the conduits 10 and 27, and leading the intake manifold vacuum pressure into the pressure chamber 9 of the positioner 5 through the conduits 10, 28. The diaphragm 7 moves rightwards under the effect of the vacuum pressure while compressing the spring 8 and the stopper 6 also moves rightwards, allowing the butterfly valve 4 to return to its fully closed position. Thus, it will be understood that at the time of deceleration of the engine from such a high speed at which the main shaft 14 is pushed rightwards by the lever 3 and the valve 19 is changed in position, the stopper 6 is held projected for a period from the time when the deceleration is commenced to the time when the valve 19 is again changed in position. In the present invention, this period is remarkably extended by the retardation of the return movement of the main shaft 14, and the carburetor butterfly valve 4 is held open at a predetermined angle for said period. Therefore, the intake air can be supplied to the engine for this period and discharge of unburned toxic components in the exhaust gas can be effectively prevented at the time of deceleration.

Although in the embodiment described above the main shaft 14 is of a type having the circumferential grooves 29 and the axial groove 30 formed in the outer peripheral surface thereof, it may alternately be of a type having a spiral groove 35 in the outer peripheral surface as shown in FIG. 2.

With the device of the invention constructed and operating as described above, it is possible to keep the carburetor butterfly valve 4 slightly open for a predetermined period of time by the positioner 5 when the vehicle is decelerated from a predetermined range of angle of the valve 4 or from a speed of the vehicle over a predetermined speed, and therefore, the device achieves the remarkable advantage that discharge of toxic components, such as unburned hydrocarbons (HC) and carbon monoxide (CO), the amounts of which would otherwise increase in the exhaust gas at the time of deceleration can be prevented, without being accompanied by the defects of the conventional devices, such as complexity of construction, liability to troubles, expensiveness and ineffectiveness of the engine brake at the time of low speed running. The device of the invention has the additional advantage over the conventional ones that it is less susceptible to malfunction caused by clogging of the fluid passage, since the fluid passage in the device of the invention, which provides the butterfly valve closure retarding effect, is constituted by the labyrinth groove 29, 30, or the spiral groove 35 formed in the main shaft 14 of the dash pot 11, which is larger in cross section than the extremely small holes provided in this type of conventional devices.

We claim:

1. A device for controlling the closure of a carburetor butterfly valve of an engine by controlling the pivotal movement thereof comprising:

a lever secured to said butterfly valve and being pivotally movable therewith;

a positioner means for limiting the closure of said butterfly valve, said positioning means including a pressure chamber, a diaphragm positioned within said chamber, said diaphragm being reciprocally movable in response to fluid pressure differential in said chamber, and a stopper connected to said diaphragm and being movable between a first closure limiting position and a second closure position, said stopper when in said first closure limiting position limiting the closure of said butterfly valve, and when in said second closure position permitting the complete closure of said butterfly valve; and a dash pot, said dash pot including a main shaft, a sub-shaft having one end communicating with said main shaft through a first spring means with the other end thereof being biased toward said main shaft by a second spring means, said lever forcing said main shaft against said first spring means when said lever is rotated beyond a predetermined angle in a first butterfly opening direction, said sub-shaft being moved in response to the movement of said main shaft against the bias of said second spring means, a change-over valve mounted to said sub-shaft and being operable to vary the fluid pressure differential in said pressure chamber in response to the movement of said sub-shaft wherein said stopper is moved to said first closure limiting position only when said butterfly valve and said lever is rotated beyond said predetermined angle, means for retarding the reverse movement of said main shaft when said butterfly valve is closed after having been rotated beyond said predetermined angle, said butterfly valve being limited by said stopper for a predetermined time related to the retarding movement time of said main shaft to thereby maintain said butterfly valve at an open angle greater than the closure angle thereof.

2. A device according to claim 1 wherein said means for retarding the movement of said main shaft includes an enclosure divided into two chambers by a diaphragm secured to said main shaft, said two chambers being filled with a fluid, and a labyrinth groove formed in the outer peripheral surface of said main shaft, said two chambers communicating with each other through said labyrinth groove when said carburetor butterfly valve is being closed, the movement of said main shaft thereby being retarded by restricting the flow rate of said fluid through said labyrinth groove from one chamber to the other.

3. A device according to claim 1 wherein said means for retarding the movement of said main shaft includes an enclosure divided into two chambers by a diaphragm secured to said main shaft, said two chambers being filled with a fluid, and a spiral groove formed in the outer peripheral surface of said main shaft, said two chambers communicating with each other through said spiral groove when said carburetor butterfly valve is being closed, the movement of said main shaft being retarded by restricting the flow rate of said fluid through said spiral groove from one chamber to the other.

* * * * *